United States Patent
Chollet

(10) Patent No.: US 12,196,266 B2
(45) Date of Patent: Jan. 14, 2025

(54) BEARING DEVICE WITH INTEGRATED ELECTRICAL INSULATION, IN PARTICULAR FOR AN ELECTRIC MOTOR OR MACHINE, AND METHOD OF FORMING SAME

(71) Applicant: AKTIEBOLAGET SKF, Gothenburg (SE)

(72) Inventor: Mickael Chollet, Joué-lès-Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 74 days.

(21) Appl. No.: 18/351,568

(22) Filed: Jul. 13, 2023

(65) Prior Publication Data
US 2024/0026926 A1 Jan. 25, 2024

(30) Foreign Application Priority Data

Jul. 21, 2022 (FR) ........................................ 2207491

(51) Int. Cl.
*F16C 19/06* (2006.01)
*F16C 19/04* (2006.01)
(Continued)

(52) U.S. Cl.
CPC ............ *F16C 33/585* (2013.01); *F16C 19/04* (2013.01); *F16C 19/06* (2013.01); *F16C 19/52* (2013.01);
(Continued)

(58) Field of Classification Search
CPC .......... F16C 19/04; F16C 19/06; F16C 19/52; F16C 33/585; F16C 33/586; F16C 33/62;
(Continued)

(56) References Cited

U.S. PATENT DOCUMENTS 1,513,295 A * 10/1924 Talley ..................... F16C 19/08
310/90
2,283,839 A 5/1942 Wright
(Continued)

FOREIGN PATENT DOCUMENTS

CN 103780001 A 5/2014
DE 102007060968 A1 7/2008
(Continued)

OTHER PUBLICATIONS

Preliminary Search Report from the French Patent Office dated Feb. 20, 2023 in related French application No. FR2207491, including Search Report and Written Opinion.

*Primary Examiner* — Phillip A Johnson
(74) *Attorney, Agent, or Firm* — J-TEK LAW PLLC; Scott T. Wakeman; Mark A. Ussai

(57) ABSTRACT

A bearing device includes first and second rings each having end faces and being configured to rotate relative to one another, and the second ring has an annular groove. A socket having an electrically insulating sleeve is mounted on the second ring with the insulating lining radially interposed between the second ring and the socket. End faces of the electrically insulating lining each have an annular groove with a bottom that is offset axially inward relative to the respective first and second end faces of the second ring and to the respective first and second end faces of the socket. A method includes grinding end faces of the socket and/or second ring to reduce an axial depth of the grooves in the insulating layer.

11 Claims, 5 Drawing Sheets

(51) Int. Cl.
*F16C 19/52* (2006.01)
*F16C 33/58* (2006.01)
*F16C 33/62* (2006.01)
*F16C 33/64* (2006.01)
*F16C 35/073* (2006.01)
*F16C 35/077* (2006.01)

(52) U.S. Cl.
CPC ............ *F16C 33/586* (2013.01); *F16C 33/62* (2013.01); *F16C 33/64* (2013.01); *F16C 35/077* (2013.01); *F16C 2202/30* (2013.01); *F16C 2220/06* (2013.01); *F16C 2220/60* (2013.01); *F16C 2380/26* (2013.01)

(58) Field of Classification Search
CPC ....... F16C 33/64; F16C 35/073; F16C 35/077; F16C 2202/30; F16C 2220/06; F16C 2220/60; F16C 2380/26
See application file for complete search history.

(56) References Cited

U.S. PATENT DOCUMENTS

| | | |
|---|---|---|
| 3,447,846 A | 6/1969 | Marsh |
| 4,511,837 A * | 4/1985 | Vermeiren ............ G01B 7/085 340/682 |
| 5,059,041 A | 10/1991 | Watanabe et al. |
| 11,002,315 B2 | 5/2021 | Stephan |
| 2010/0326788 A1 | 12/2010 | Kamm et al. |
| 2011/0038577 A1 | 2/2011 | Horling et al. |
| 2014/0111046 A1 | 4/2014 | Murikipudi et al. |
| 2015/0322790 A1 | 11/2015 | Yao et al. |
| 2019/0323558 A1 | 10/2019 | Stephan |
| 2020/0047795 A1 | 2/2020 | Falossi et al. |
| 2023/0220874 A1 | 7/2023 | Arnault et al. |
| 2023/0220881 A1 | 7/2023 | Arnault et al. |
| 2023/0220882 A1 | 7/2023 | Arnault et al. |
| 2023/0223813 A1 | 7/2023 | Arnault et al. |

FOREIGN PATENT DOCUMENTS

| | | | |
|---|---|---|---|
| DE | 102007060906 B3 | 10/2009 | |
| DE | 102013223677 A1 * | 5/2015 | ............. F16C 19/52 |
| DE | 102020106338 A1 | 9/2021 | |
| EP | 0417744 A2 | 3/1991 | |
| EP | 0417744 B1 | 1/1995 | |
| EP | 2258637 A2 | 12/2010 | |
| JP | H04210124 A | 7/1992 | |
| JP | H1037949 A | 2/1998 | |
| JP | 2005320983 A | 11/2005 | |
| JP | 2008057568 A | 3/2008 | |
| JP | 2013241948 A | 12/2013 | |
| JP | 2019138467 A | 8/2019 | |
| WO | 2019156050 A1 | 8/2019 | |

* cited by examiner

BEARING DEVICE WITH INTEGRATED ELECTRICAL INSULATION, IN PARTICULAR FOR AN ELECTRIC MOTOR OR MACHINE, AND METHOD OF FORMING SAME

CROSS-REFERENCE

This application claims priority to French patent application no. 2207491 filed on Jul. 21, 2022, the contents of which are fully incorporated herein by reference.

TECHNOLOGICAL FIELD

In an electric motor or machine, at least one rolling bearing is mounted between the housing of the electric motor or machine and the rotary shaft so as to support this shaft.

In operation, when the shaft is rotating, an electrical potential difference can appear between the shaft and the housing of the electric motor or machine, and this produces an electric current between the inner ring of the rolling bearing, which is secured to the shaft, and the outer ring, which is secured to the housing.

The electric current passing through the components of the rolling bearing can damage these components, in particular the rolling elements and the raceways formed on the inner and outer rings. Electrical discharges can also generate vibrations.

To overcome these drawbacks, it is known practice to replace the rolling elements of the bearing, which are often made of the same steel as the inner and outer rings, with rolling elements made of ceramic material. These are generally referred to as hybrid rolling bearings. However, such a hybrid rolling bearing is relatively expensive.

The present invention therefore aims to overcome the abovementioned drawbacks.

SUMMARY

Embodiments of the disclosed invention relate to a bearing device comprising a bearing provided with a first ring and a second ring that are able to rotate relative to one another. According to a general feature, the device also comprises at least one insulating sleeve mounted on the second ring of the bearing.

The insulating sleeve is provided with a socket and an insulating lining radially interposed between the second ring of the bearing and the socket. The insulating lining is overmolded on the second ring and on the socket. The insulating lining is made of electrically insulating material.

This results in a bearing device with integrated electrical insulation that is inexpensive compared with conventional hybrid rolling bearings. Moreover, the device is easy to manufacture and to assemble in the associated electric motor or machine.

Furthermore, the insulating lining is not exposed to impacts as it is arranged radially between the second ring of the bearing and the socket. Moreover, if the insulating lining is made of synthetic material or elastomeric material, the device becomes less sensitive to changes in temperature.

According to a general feature, the insulating lining comprises two opposite end faces axially delimiting the insulating lining. An annular groove is formed in each of the end faces and has a bottom that is axially offset towards the inside of the device relative to the end face of the second ring and to the end face of the socket that are situated axially on the side of the end face.

On account of the grooves provided in the end faces of the insulating lining, during the grinding operation performed on the end faces of the outer ring and of the socket during the manufacturing of the device, any machining of the insulating lining is limited, thereby making the manufacturing easier and limiting the risk of particles of the insulating lining adhering to the abrasive machining wheel.

In one particular embodiment, an annular groove is formed in each of the end faces of the outer ring and extends radially inwards the groove in the end face of the insulating lining that is situated axially on the same side. The device also comprises two washers made of electrically insulating material and each arranged in the two annular grooves situated axially on the same side.

Such a design allows the device to be used in applications in which higher axial loads are applied to the bearing. Specifically, the axial loads passing through the bearing are transmitted by the washers to the housing or to the associated shaft.

In another embodiment, for the same purpose of allowing higher axial loads to be transmitted, the insulating lining may also be provided with first and second groups of protuberances (or projections), the protuberances of one group extending axially from the bottom of one of the annular grooves in the insulating lining and being spaced apart from one another in the circumferential direction. The protuberances allow axial loads passing through the bearing to be transmitted.

The second ring of the bearing comprises an outer surface and an inner surface opposite the outer surface, which delimit the radial thickness of the second ring. The insulating lining may be radially interposed between the socket and one of the outer and inner surfaces of the second ring.

In one particular embodiment, the socket is made of metal. The socket can thus be easily machined to a predetermined radial tolerance.

In one embodiment, the insulating lining covers the whole of the surface of the second ring of the bearing. In this case, the insulating lining entirely covers the surface of the second ring in the axial direction and in the circumferential direction.

According to a first design, the socket delimits the outer surface of the device. In this case, the second ring is the outer ring of the bearing. According to a second alternative design, the socket delimits the inner surface of the device. In this case, the second ring is the inner ring of the bearing.

In one particular embodiment, the bearing comprises at least one row of rolling elements arranged between raceways of the first and second rings. The rolling elements may be made of metal.

The invention also relates to a method for manufacturing a bearing device as defined above, comprising:
  a step of overmolding the insulating lining on the second ring of the bearing and on the socket, the annular grooves in the insulating lining being formed during the overmolding,
  a step of grinding the end faces of the second ring and the end faces of the socket of the assembly formed by the second ring, the socket and the insulating lining, and
  a step of assembling the assembly with the first ring of the bearing.

Another aspect of the disclosure comprises a method for manufacturing a bearing device that includes providing a first bearing ring having a first end face having a first annular groove and a second end face having a second annular groove, mounting the first bearing ring concentrically with a socket, the socket having a first end face and a second end face, overmolding an electrically insulating lining between the first bearing ring and the socket such that the electrically insulating lining extends into the first and second annular grooves of the first bearing ring to connect the first bearing ring to the socket. The method also includes forming a first annular groove in a first end face of the electrically insulating lining such that a bottom of the first annular groove of the electrically insulating lining is axially inset from the first end face of the bearing ring and forming a second annular groove in a second end face of the electrically insulating lining such that a bottom of the second annular groove of the electrically insulating lining is axially inset from the second end face of the bearing ring, wherein the first and second annular grooves in the end faces of the electrically insulating lining may occur simultaneously with the overmolding process. The method may also comprise grinding the first and second end faces of the socket and the first and second end faces of the first bearing ring to reduce an axial depth of the first annular groove of the insulating lining and to reduce an axial depth of the second annular groove of the insulating lining.

The invention also relates to an electric motor comprising a housing, a shaft and at least one bearing device as defined above, mounted radially between the housing and the shaft.

BRIEF DESCRIPTION OF THE DRAWINGS

Embodiments of the present invention will be better understood upon studying the detailed description of embodiments, given by way of non-limiting example and illustrated by the appended drawings, in which.

DETAILED DESCRIPTION

Figure 1:
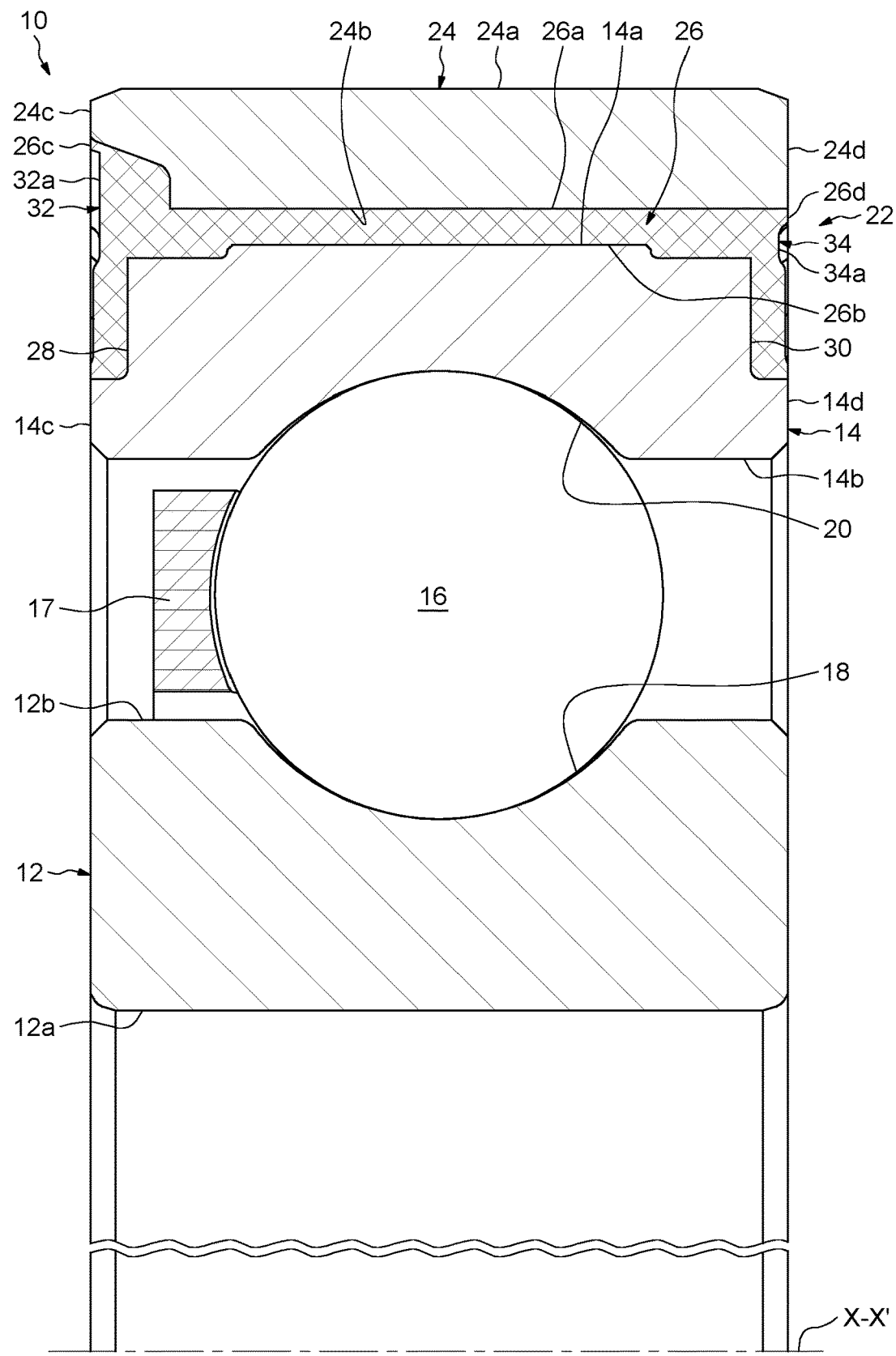
FIG. 1 sectional side elevational view of a portion of a bearing device according to a first exemplary embodiment of the invention

The bearing device shown in FIG. 1 comprises a bearing 10 provided with a first ring 12 and a second ring 14 that are configured to rotate relative to one another about the axis X-X' of the bearing. In the exemplary embodiment shown, the first ring 12 is the inner ring of the bearing, and the second ring 14 is the outer ring.

As will be described in more detail below, the bearing device is designed so as not to conduct electrical current. The bearing device has integrated electrical insulation.

The inner 12 and outer 14 rings of the bearing are concentric and extend axially along the axis X-X' of the bearing. The inner 12 and outer 14 rings are made of steel. The rings are solid. A "solid ring" is understood to mean a ring having a shape obtained by machining with removal of chips (by turning or grinding) from tubes, bar stock, or forged and/or rolled blanks.

In the exemplary embodiment shown, the bearing 10 also comprises a row of rolling elements 16, in this case balls, radially interposed between the inner ring 12 and the outer 14 ring. The rolling elements 16 are made of steel. The bearing 10 also comprises a cage 17 for maintaining a regular circumferential spacing between the rollers 16. The bearing 10 may also be fitted with seals (not illustrated).

The inner ring 12 comprises a cylindrical bore 12a, a cylindrical axial outer surface 12b radially opposite the bore 12a, and two opposite radial end faces (not referenced) axially delimiting the bore and the outer surface. The bore 12a and the outer surface 12b delimit the radial thickness of the inner ring 12.

The inner ring 12 further comprises an inner raceway 18 for the rolling elements 16, which is formed on the outer surface 12b. The raceway 18 is directed radially outwards.

The outer ring 14 comprises a cylindrical axial outer surface 14a, a cylindrical bore 14b radially opposite the outer surface 14a, and two opposite radial end faces 14c, 14d axially delimiting the bore and the outer surface. The outer surface 14a and the bore 14b delimit the radial thickness of the outer ring 14. The radial end faces 14c, 14d delimit the axial thickness of the outer ring 14. In other words, the radial end faces 14c, 14d axially delimit the outer ring.

In the exemplary embodiment shown, a recess or groove 28 is formed in the end face 14c of the outer ring 14. The groove 28 is oriented axially towards the outside of the device. The groove 28 has a bottom (not referenced) that is axially offset towards the inside of the device relative to the end face 14c. Similarly, a recess or groove 30 is formed in the end face 14d of the outer ring. The groove 30 is oriented axially towards the outside of the device. The groove 30 has a bottom (not referenced) that is axially offset towards the inside of the device relative to the end face 14d. The groove 28 and the groove 30 face away from each other in opposite axial directions.

In the exemplary embodiment shown, the outer surface 14a of the outer ring is stepped and has two distinct diameters—an axially central portion has a greater diameter than portions to either axial side of the central portion. Alternatively, the outer surface 14a could have just one diameter.

The outer ring 14 further comprises an outer raceway 20 for the rolling elements 16, which is formed on the bore 14b. The raceway 20 is directed radially inwards.

The bearing device also comprises an electrically insulating sleeve 22 mounted on the outer ring 14. The insulating sleeve 22 is mounted on the outer surface 14a of the outer ring 14. The insulating sleeve 22 is secured to the outer ring 14.

The insulating sleeve 22 comprises a socket 24 and an insulating lining 26 (insulating body or insulator body) radially interposed between the outer ring 14 and the socket 24. The insulating lining 26 is overmolded on the outer ring 14 and on the socket 24.

The socket 24 has an annular shape. The socket 24 extends axially. The socket 24 is made in one piece. The socket 24 comprises a cylindrical axial outer surface 24a, a cylindrical bore 24b radially opposite the outer surface 24a, and two opposite radial end faces 24c, 24d axially delimiting the bore and the outer surface. The outer surface 24a and the bore 24b delimit the radial thickness of the socket 24. The outer surface 24a of the socket delimits the outer surface of the bearing device 10. In other words, the outer surface 24a defines the outer diameter of the bearing device 10. The end faces 24c, 24d delimit the axial thickness of the socket 24. In other words, the end faces 24c, 24d axially delimit the socket. In the exemplary embodiment shown, the bore 24b of the socket is stepped—that is, portions of the bore 24b have different diameters.

The socket 24 is advantageously made of metal. Thus, the outer surface 24a of the socket can be easily machined to a predetermined tolerance if needed. Preferably, the socket 24 is made of steel. The socket 24 may be obtained from a sheet metal blank by cutting, pressing and rolling. Alternatively, the socket 24 may be obtained from a tube or from forged and/or rolled blanks or else from sintering and stamping.

The insulating lining 26 is made of electrically insulating material. For example, the insulating lining 26 may be made of synthetic material, such as (polyether ether ketone) PEEK or polyamide 46 (nylon-46; PA46), or else be made of elastomeric material, for example rubber.

The insulating lining 26 is radially interposed between the outer surface 14a of the outer ring and the bore 24b of the socket. The insulating lining 26 covers the outer surface 14a of the outer ring. The insulating lining 26 also covers the bore 24b of the socket. The insulating lining 26 is complementary in shape with the outer surface 14a of the outer ring and the bore 24b of the socket as it is overmolded on these surfaces. The insulating lining 26 in this case entirely covers the bore 24b with respect to the axial and circumferential directions. The insulating lining 26 also covers/fills the grooves 28, 30 in the end faces 14c, 14d of the outer ring.

The insulating lining 26 has an annular shape. The insulating lining 26 extends axially. The insulating lining 26 comprises a cylindrical axial outer surface 26a, a cylindrical bore 26b radially opposite the outer surface 26a, and two opposite radial end faces 26c, 26d axially delimiting the bore and the outer surface. The outer surface 26a and the bore 26b delimit the radial thickness of the insulating lining 26. The end faces 26c, 26d delimit the axial thickness of the insulating lining. In other words, the end faces 26c, 26d axially delimit the insulating lining. The outer surface 26a is in radial contact with the bore 24b of the socket. The bore 26b is in radial contact with the outer surface 14a of the outer ring.

An annular recess or groove 32 is formed in the end face 26c of the insulating lining 26. The groove 32 is oriented axially towards the outside of the device. The groove 32 has a bottom 32a that is axially offset towards the inside of the device relative to the end face 14c of the outer ring 14 and relative to the end face 24c of the socket. In the exemplary embodiment shown, the groove 32 extends over most of the end face 26c of the insulating lining. As a variant, it could be possible for the groove 32 to have a smaller radial dimension. In the exemplary embodiment shown, the bottom 32a of the groove has a stepped form. As a variant, the bottom 32a could extend purely radially. Alternatively, the bottom 32a could extend obliquely.

The axial depth of the groove 32 is greater than or equal to the thickness of material required to be removed by machining during the manufacturing of the device, as will be described in more detail below.

An annular recess or groove 34 is formed in the end face 26d of the insulating lining. The groove 34 is oriented axially towards the outside of the device. The groove 34 has a bottom 34a that is axially offset towards the inside of the device relative to the end face 14d of the outer ring 14 and relative to the end face 24d of the socket. In the exemplary embodiment shown, the groove 34 extends over most of the end face 26d of the insulating lining. As a variant, it could be possible for the groove 34 to have a smaller radial dimension. In the exemplary embodiment shown, the bottom 34a of the groove has a stepped form. As a variant, the bottom 34a could extend purely radially. Alternatively, the bottom 34a could extend obliquely. The axial depth of the groove 34 is greater than or equal to the thickness of material required to be removed by machining during the manufacturing of the device.

The bearing device is manufactured as follows.

In a first step, the outer ring 14 of the bearing and the socket 24 are mounted inside a mold, which is provided for the overmolding of the insulating lining 26. In this position mounted inside the mold, the socket 24 is held at a radial distance from the outer ring 14.

Next, during a subsequent second step, the insulating lining 26 is overmolded both on the outer ring 14 and on the socket 24. The grooves 32, 34 in the insulating lining are formed during the overmolding.

Figure 2:
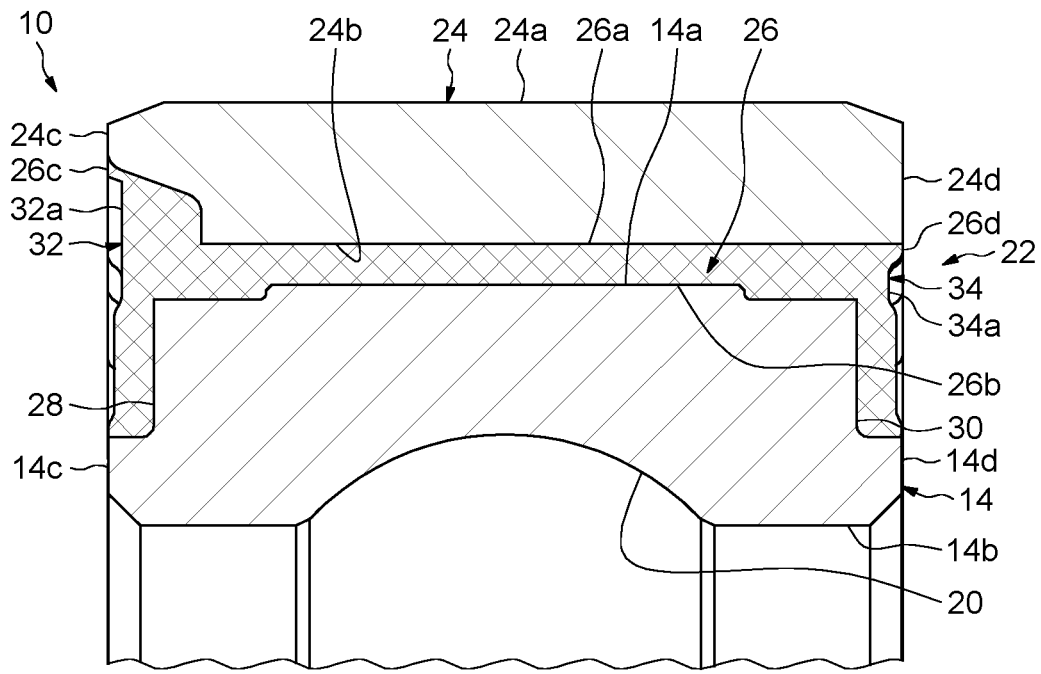
FIG. 2 is a sectional side elevational view of a portion of a bearing outer ring and insulating sleeve at one stage of a manufacturing process before a grinding operation has been performed.

Then, the unitary assembly formed by the outer ring 14, the insulating lining 26 and the socket 24 is removed from the mold. This unitary assembly is shown in FIG. 2.

Next, during a fourth step, the end faces 14c, 24c and the end faces 14d, 24d of the outer ring and of the socket are ground. On account of the grooves 32, 34 provided in the end faces 26c, 26d of the insulating lining, the grinding operation is performed mainly on the end faces 14c, 24c and 14d, 24d of the outer ring and of the socket, rather than on the insulating lining 26. As indicated above, the thickness of material removed during the grinding of the end faces 14c, 14d of the outer ring and of the end faces 24c, 24d of the socket is less than or equal to the axial depth of the grooves 32, 34. The outer ring and socket are shown in FIG. 3 after the grinding operation has been performed.

Figure 3:
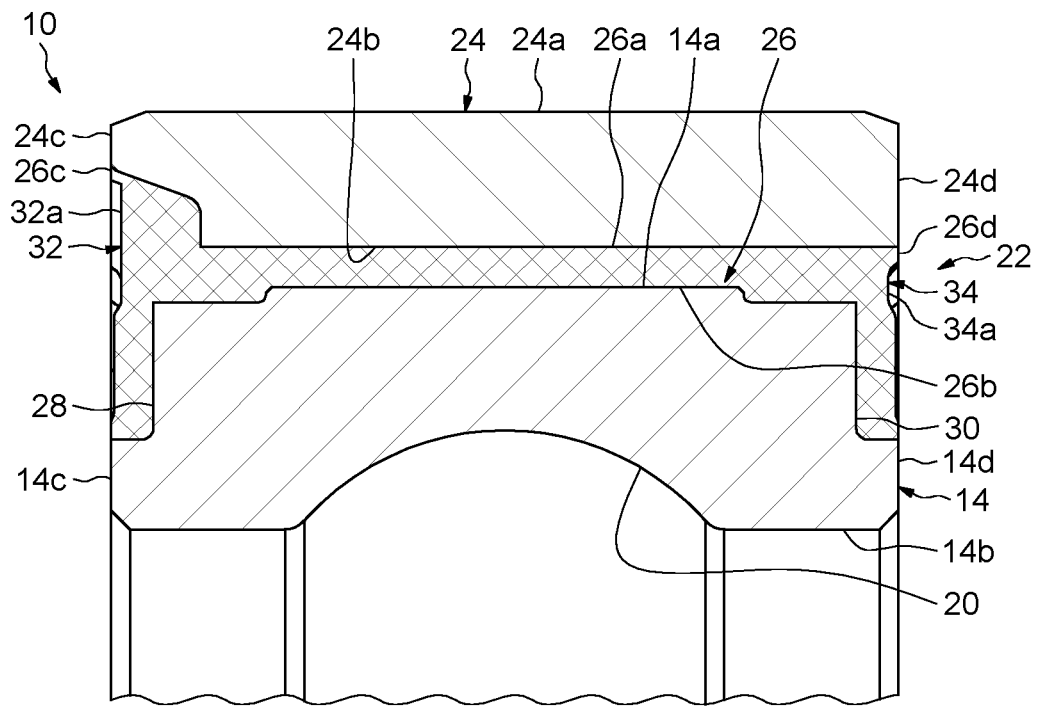
FIG. 3 is a sectional side elevational view of the bearing outer ring and insulating sleeve of FIG. 2 after a grinding operation has been performed.

The unitary assembly formed by the outer ring 14, the insulating lining 26 and the socket 24 after the above grinding operation has been performed is shown in FIG. 3.

Finally, this unitary assembly is assembled with the row of rolling elements 16, the cage 17 and the inner ring 12.

Figure 4:
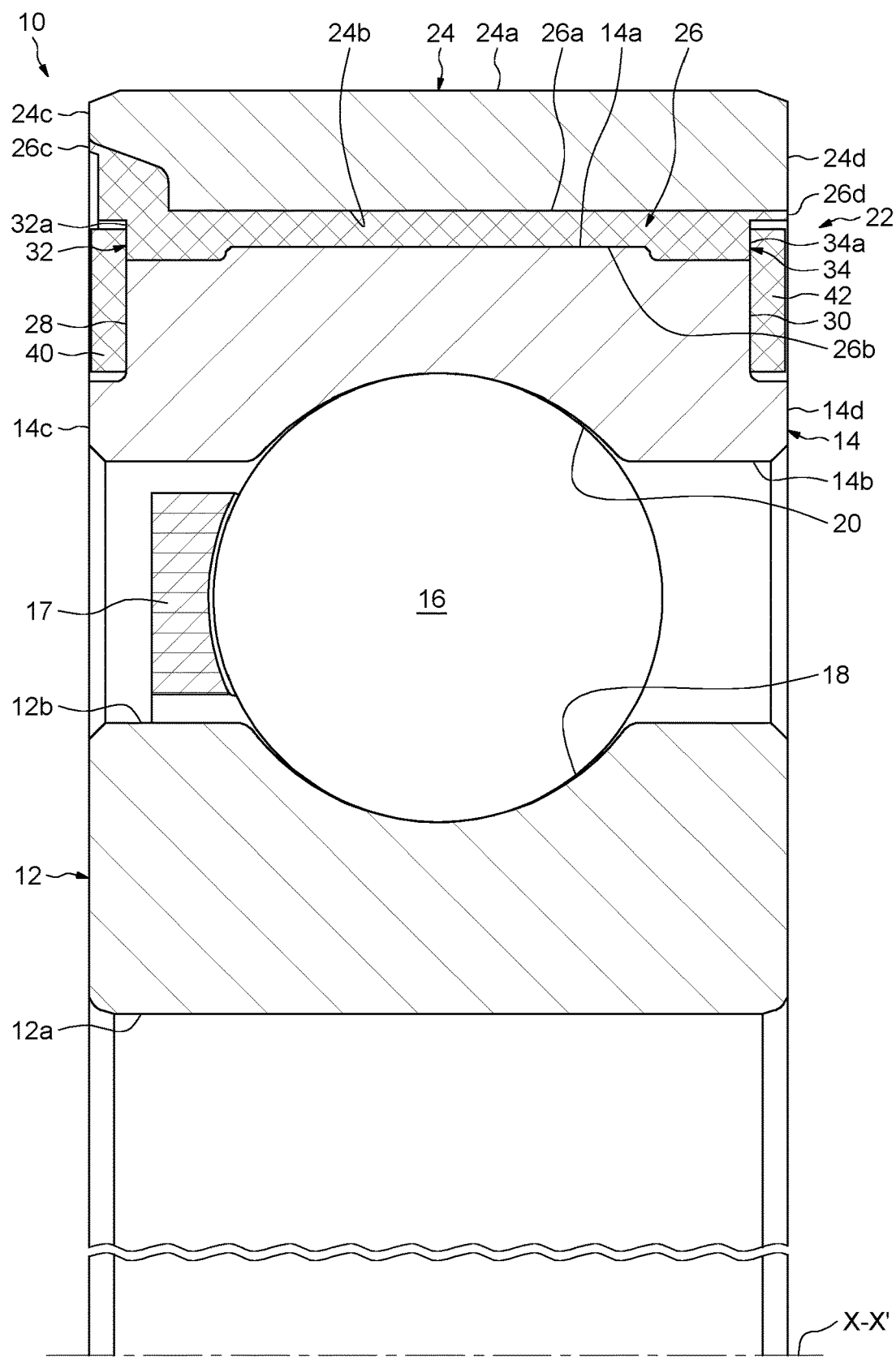
FIG. 4 sectional side elevational view of a portion of a bearing device according to a second exemplary embodiment of the invention.

The exemplary embodiment shown in FIG. 4, in which identical elements bear the same references, differs from the first example in particular in that each of the grooves 32, 34 in the insulating lining has a smaller axial depth than in the first embodiment described above. Furthermore, in this example, the insulating lining 26 does not cover the grooves 28, 30 in the end faces 14c, 14d of the outer ring.

The groove 28 extends radially inwards from the groove 32 in the end face 26c of the insulating lining, and the groove 30 extends radially inwards from the groove 34 in the end face 26d of the insulating lining.

In this example, the device also comprises a first washer 40 arranged in the groove 28 of the outer ring and in the groove 32 of the insulating lining, and a second washer 42 arranged in the groove 30 of the outer ring and inside the groove 34 of the insulating lining. The washers 40, 42 bear axially against the grooves 28 and 32, 30 and 34, respectively.

The washers 40, 42 are made of electrically insulating material. For example, the washers 40, 42 may be made of synthetic material, such as PEEK or PA46, or else be made of elastomeric material, for example rubber.

Figure 5:
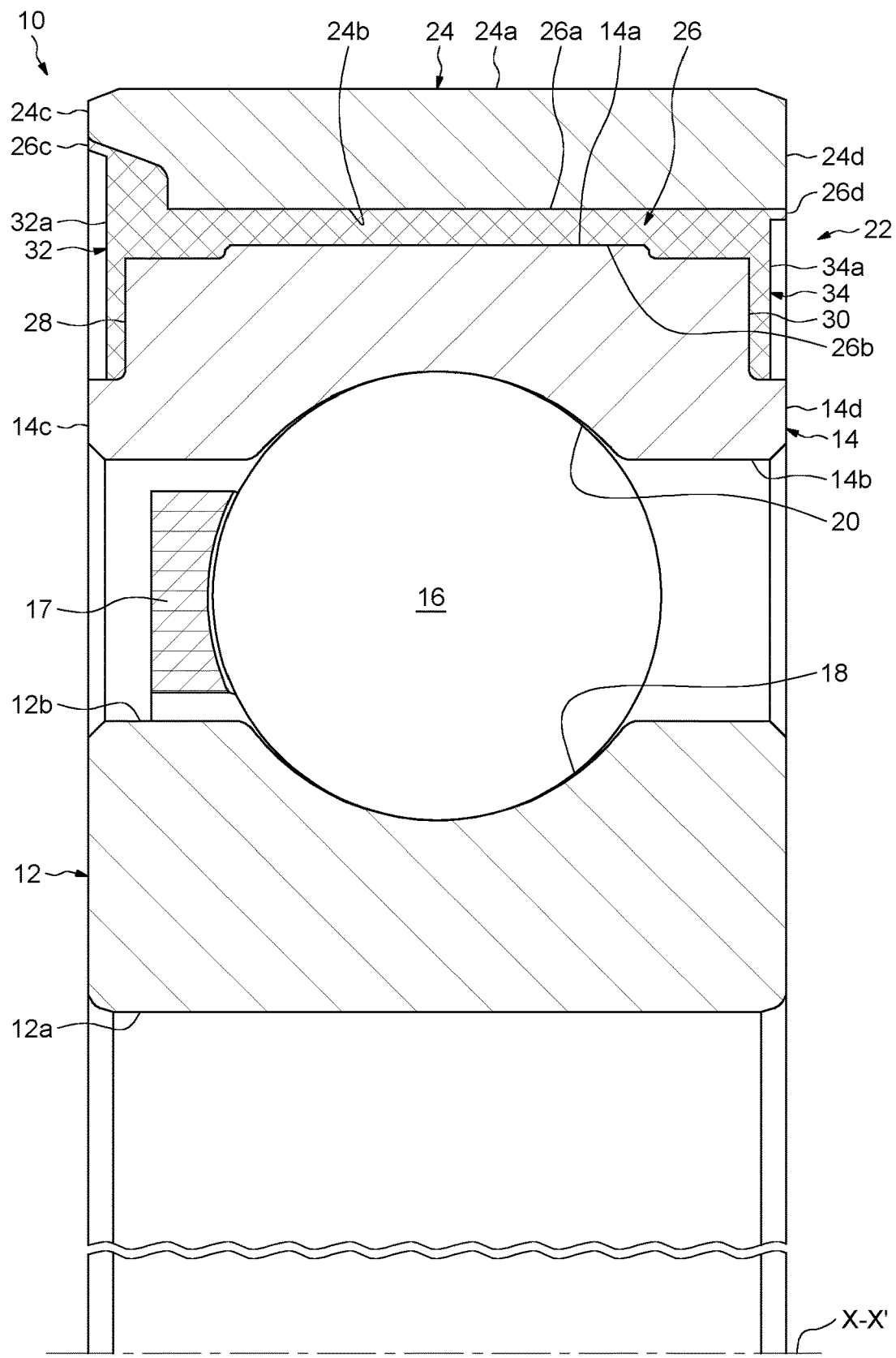
FIG. 5 is a first radial sectional view of a portion of a bearing device according to a third exemplary embodiment of the invention.
Figure 6:
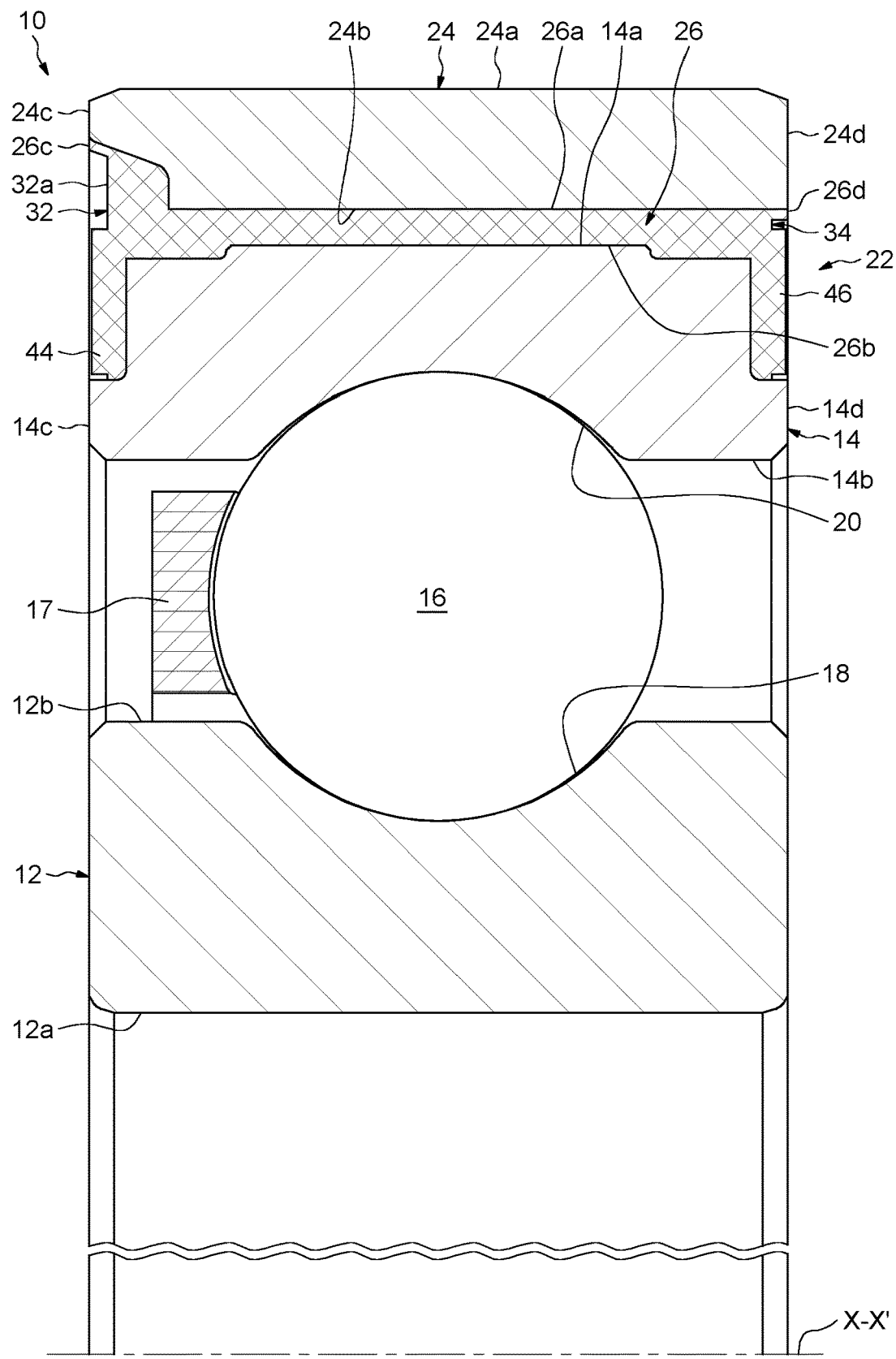
FIG. 6 is a second radial sectional view of the bearing device of FIG. 5.

The exemplary embodiment shown in FIGS. 5 and 6, in which identical elements bear the same references, differs from the first example in that the insulating lining is provided with a first group of protuberances 44 extending axially from the bottom 32a of the groove formed in the end face 26c, and with a second group of protuberances 46 extending axially from the bottom 34a of the groove formed in the end face 26d. The protuberances 44, 46 of each group are spaced apart from one another in the circumferential direction, preferably regularly spaced apart. The protuberances 44, 46 are made as one piece with the insulating lining. The protuberances 44, 46 extend axially inside the associated groove 32, 34 and are axially set back from the end face 26c, 26d of the insulating lining.

As indicated above, in the exemplary embodiments shown, the first ring 12 of the bearing is the inner ring and the second ring 14 to which the insulating sleeve 22 is attached is the outer ring. Alternatively, it is possible to envisage a reverse arrangement in which the second ring 14 to which the insulating sleeve is attached is the inner ring. In this case, the insulating sleeve is mounted in the bore 12a of the inner ring. The insulating lining is then radially interposed between the bore 12a of the inner ring and the outer surface of the socket. The bore of the socket delimits the bore of the bearing device.

In the exemplary embodiments described, the bearing of the device is provided with a single row of rolling elements. As a variant, the bearing may be provided with several rows of rolling elements. Furthermore, the rolling bearing may include types of rolling elements other than balls, for example rollers. In another variant, the bearing may be a sliding bearing without any rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved insulated bearing devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter

What is claimed is:

1. A bearing device comprising:
   a first ring and a second ring configured to rotate relative to one another, the second ring having a first end face having a first annular groove and a second end face axially spaced from the first end face of the second ring and having a second annular groove, and
   an insulating sleeve mounted on the second ring, the insulating sleeve including a socket having a first end face and a second end face axially spaced from the first end face of the socket and an insulating lining radially interposed between the second ring and the socket and extending into the first annular groove of the second ring and into the second annular groove of the second ring,
   wherein the insulating lining comprises an electrically insulating material,
   wherein the insulating lining is overmolded on the second ring of the bearing and on the socket and extends into the first and second annular grooves of the second ring,
   wherein the insulating lining includes a first end face and a second end face axially opposite the first end face of the insulating lining, the first and second end faces of the insulating lining axially delimiting the insulating lining, and
   wherein each of the first and second end faces of the insulating lining includes an annular groove having a bottom that is offset axially inward relative to the respective first and second end faces of the second ring and relative to the respective first and second end faces of the socket.

2. The bearing device according to claim 1, including an electrically insulating washer mounted in each of the first and second annular grooves in the insulating lining.

3. The bearing device according to claim 1, wherein each of the first and second end faces of the insulating lining includes a plurality of axially extending, circumferentially spaced protuberances.

4. The bearing device according to claim 1, wherein the second ring includes a radially outer surface and a radially inner surface delimiting a radial thickness of the second ring, and
wherein the insulating lining is radially interposed between the socket and the radially inner surface of the second ring or between the socket and the radially outer surface of the second ring.

5. The bearing device according to claim 1, wherein the insulating lining is made of a synthetic material or of an elastomeric material.

6. The bearing device according to claim 1, wherein the socket is made of metal.

7. The bearing device according to claim 1, wherein the socket delimits an outer surface or an inner surface of the bearing device.

8. The bearing device according to claim 1, including at least one row of metal rolling elements arranged between raceways of the first and second rings.

9. A method for manufacturing a bearing device comprising:
   providing a first bearing ring having a first end face having a first annular groove and a second end face having a second annular groove,
   mounting the first bearing ring concentrically with a socket, the socket having a first end face and a second end face,
   overmolding an electrically insulating lining between the first bearing ring and the socket such that the electrically insulating lining extends into the first and second annular grooves of the first bearing ring to connect the first bearing ring to the socket,
   forming a first annular groove in a first end face of the electrically insulating lining such that a bottom of the first annular groove of the electrically insulating lining is axially inset from the first end face of the bearing ring, and forming a second annular groove in a second end face of the electrically insulating lining such that a bottom of the second annular groove of the electrically insulating lining is axially inset from the second end face of the bearing ring.

10. The method of claim 9, including:
grinding the first and second end faces of the socket and the first and second end faces of the first bearing ring to reduce an axial depth of the first annular groove of the insulating lining and to reduce an axial depth of the second annular groove of the insulating lining.

11. The method of claim 10, including
arranging the first bearing ring and attached socket concentrically with a second bearing ring.

* * * * *